(12) United States Patent
Makuta et al.

(10) Patent No.: US 7,481,288 B2
(45) Date of Patent: Jan. 27, 2009

(54) COOLING ARRANGEMENT FOR A FUEL-CELL VEHICLE

(75) Inventors: Yohei Makuta, Saitama (JP); Yoshiyuki Horii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 562 days.

(21) Appl. No.: 11/201,308

(22) Filed: Aug. 11, 2005

(65) Prior Publication Data

US 2006/0040154 A1 Feb. 23, 2006

(30) Foreign Application Priority Data

Aug. 20, 2004 (JP) ............................. 2004-241434

(51) Int. Cl.
B60K 11/04 (2006.01)
(52) U.S. Cl. .................................... 180/68.2; 180/68.1
(58) Field of Classification Search ................ 180/65.1, 180/220, 65.3, 65.5, 65.6, 68.1, 68.2, 68.4, 180/68.6
See application file for complete search history.

(56) References Cited

U.S. PATENT DOCUMENTS

| | | | | | |
|---|---|---|---|---|---|
| 3,232,044 | A | * | 2/1966 | Gratzmuller | 60/599 |
| 4,519,473 | A | * | 5/1985 | Ochiai et al. | 180/229 |
| 4,632,206 | A | * | 12/1986 | Morinaka et al. | 180/229 |
| 5,222,572 | A | * | 6/1993 | Yamagiwa et al. | 180/220 |
| 5,228,530 | A | * | 7/1993 | Tsuchihashi | 180/68.4 |
| 5,406,154 | A | * | 4/1995 | Kawaguchi et al. | 310/67 R |
| 5,632,157 | A | * | 5/1997 | Sekino et al. | 62/244 |
| 5,647,450 | A | * | 7/1997 | Ogawa et al. | 180/220 |
| 5,730,237 | A | * | 3/1998 | Matsuki et al. | 180/65.1 |
| 6,568,496 | B1 | * | 5/2003 | Huang | 180/220 |
| 6,722,460 | B2 | * | 4/2004 | Yang et al. | 180/220 |
| 6,772,824 | B1 | * | 8/2004 | Tsuruta | 165/41 |
| 7,051,786 | B2 | * | 5/2006 | Vuk | 165/41 |
| 7,191,858 | B2 | * | 3/2007 | Vanderwees et al. | 180/65.3 |
| 7,267,086 | B2 | * | 9/2007 | Allen et al. | 123/41.44 |
| 2002/0007943 | A1 | * | 1/2002 | Ozaki et al. | 165/202 |
| 2002/0040896 | A1 | * | 4/2002 | Ap | 219/208 |
| 2002/0043413 | A1 | * | 4/2002 | Kimishima et al. | 180/68.1 |
| 2002/0162693 | A1 | * | 11/2002 | Mizuno et al. | 180/65.1 |

(Continued)

FOREIGN PATENT DOCUMENTS

EP 0 079 829 A1 5/1993

(Continued)

Primary Examiner—Christopher P Ellis
Assistant Examiner—Vaughn T Coolman
(74) Attorney, Agent, or Firm—Birch, Stewart, Kolasch & Birch, LLP

(57) ABSTRACT

To inhibit an electric pump from generating heat with a simple structure when the electric pump is used in a cooling system. A two-wheeled fuel-cell vehicle is provided with a cooling system to cool a fuel cell. A first radiator and a second radiator are provided to cool the cooling water warmed by the fuel cell with a flow of air. A cooling fan functions so as to ventilate the cooling fins of the first radiator and the cooling fans function so as to ventilate the cooling fins of the second radiator. An electric pump is disposed in the middle of a pipe line for the circulation of the cooling water. The electric pump is disposed at a position where the electric pump can catch the flow of air created by the cooling fan.

19 Claims, 6 Drawing Sheets

U.S. PATENT DOCUMENTS

| | | | |
|---|---|---|---|
| 2004/0050606 A1* | 3/2004 | Yang et al. | 180/220 |
| 2005/0115748 A1* | 6/2005 | Lanier | 180/65.1 |
| 2006/0185626 A1* | 8/2006 | Allen et al. | 123/41.12 |

FOREIGN PATENT DOCUMENTS

| | | | |
|---|---|---|---|
| EP | 1 170 477 A2 | 1/2002 |
| GB | 603132 A | 6/1948 |
| JP | 64-029612 A | 1/1989 |
| JP | 8-192639 A | 7/1996 |

\* cited by examiner

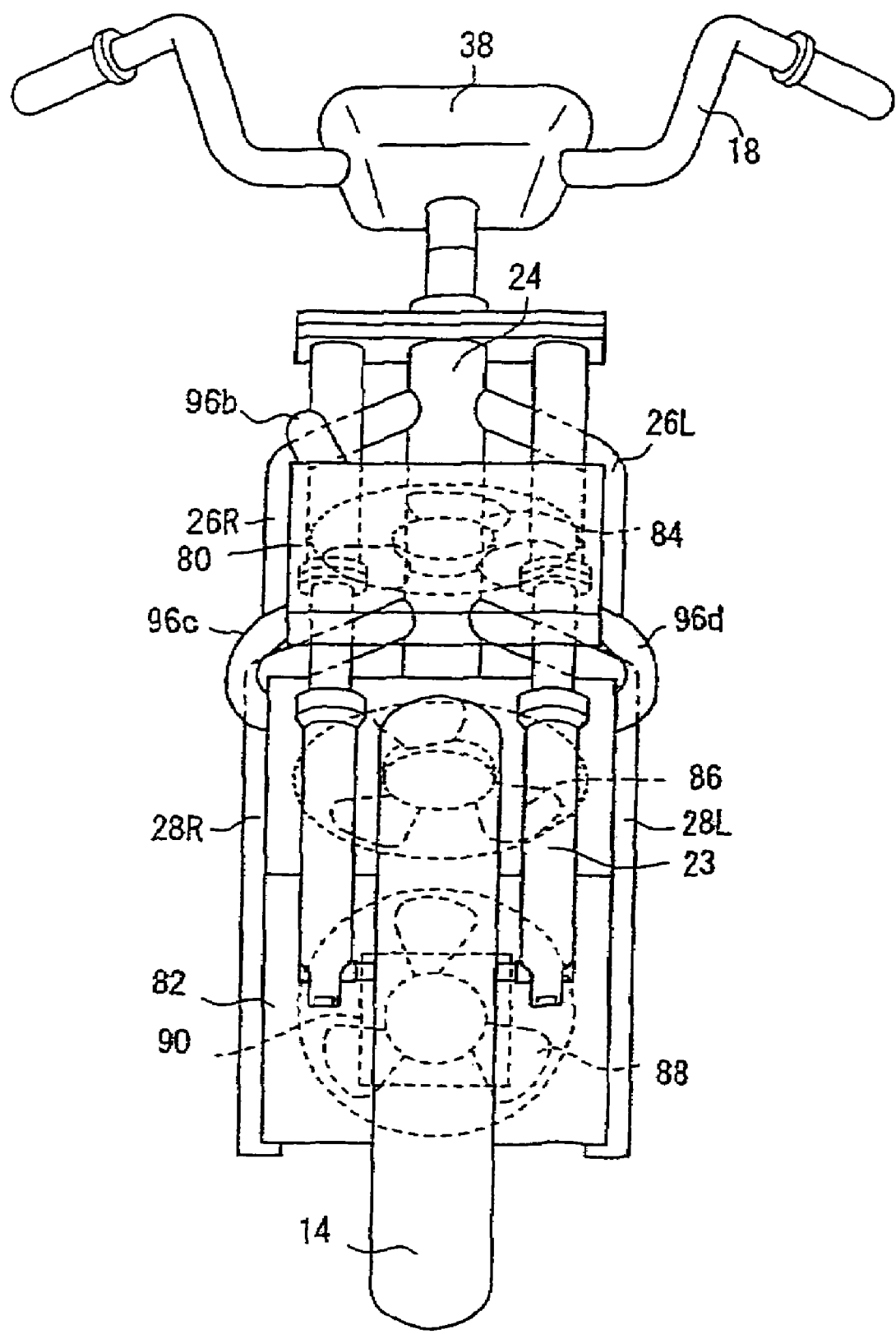

COOLING ARRANGEMENT FOR A FUEL-CELL VEHICLE

CROSS-REFERENCE TO RELATED APPLICATIONS

The present application claims priority under 35 USC 119 to Japanese Patent Application No. 2004-241434 filed on Aug. 20, 2004 the entire contents of which are hereby incorporated by reference.

FIELD OF THE INVENTION

The present invention relates to a fuel-cell vehicle that travels by electric power generated by supplying a reactive gas and a fuel gas to a fuel cell and in particular to a fuel-cell vehicle of a liquid cooling type in which the fuel cell is cooled with cooling water and the heat of the cooling water warmed by the fuel cell is dissipated by radiators.

DESCRIPTION OF BACKGROUND ART

A fuel-cell vehicle is know that travels by supplying electric power generated by a fuel-cell system to a motor for driving the wheels of the vehicle. In the fuel-cell system, a fuel-cell stack (hereunder referred to simply as "a fuel cell") generates electric power through a chemical reaction between hydrogen as a fuel gas and oxygen as a reactive gas. Here, the oxygen is taken in from the air via a compressor and the hydrogen is supplied from a high-pressure fuel gas container.

Meanwhile, the chemical reaction generates heat in a fuel-cell and in order to generate electric power efficiently, it is necessary to cool the fuel cell by dissipating excessive heat and to keep the fuel cell within an appropriate temperature range. In order to dissipate heat efficiently, it is only necessary to cool a fuel cell by using a water-cooling type cooling system and to dissipate the heat of the warmed cooling water with a radiator, for example as a fuel-cell vehicle shown in JP-A No. 192639/1996.

In a water cooling system generally used, a pipe line is connected to a heater to be cooled and a radiator so that cooling water may circulate in between and the cooling water is circulated by a pump disposed in the middle of the pipe line. Here, in some cases, a cooling fan to send air to the fins of the radiator is disposed in order to improve the heat dissipation efficiency of the radiator.

Meanwhile, as a means for driving a pump, an electric driving means that uses a built-in motor can be named. However, there is a concern in such an electric pump that the motor generates heat, thereby the efficiencies of the motor and the electric pump itself are lowered. This results in the efficiency of the cooling system being lowered. It is conceivable to cool the motor by introducing the circulated cooling water into the motor portion of the electric pump, but if such a means is applied, a more complex piping structure is required and also the thermal load of the cooling system increases.

SUMMARY AND OBJECTS OF THE INVENTION

The present invention has been established in view of such problems and the it is an object of one embodiment to provide a fuel-cell vehicle capable of inhibiting an electric pump from generating heat with a simple structure when the electric pump is used in a cooling system to cool a fuel cell.

In one embodiment of the present invention, a fuel-cell vehicle is provided which travels by electric power generated by supplying a reactive gas and a fuel gas to a fuel cell with a liquid cooling system to cool the fuel cell. The fuel-cell vehicle is equipped with a first radiator and a second radiator to dissipate heat and cool a coolant warmed by the fuel cell. Cooling fans are provided to ventilate the cooling fins of the first and second radiators respectively. An electric pump, which is disposed in the middle of the pipe line of the cooling system, is provided to circulate the coolant. The electric pump is disposed at a place where the electric pump can catch the flow of air created by at least one of the cooling fans.

By disposing an electric pump at a place where the electric pump can catch the flow of air created by a cooling fan as stated above, it is possible to inhibit the electric pump from generating heat with a simple structure. Moreover, since a coolant has nothing to do with the cooling of the electric pump, the thermal load of the cooling system does not increase.

In this case, when the electric pump is located so that the projection thereof is in the projected area of the second radiator on a plane perpendicular to the longitudinal direction of the fuel-cell vehicle, the air having passed through the second radiator during traveling is blown against the electric pump and thus the heat generation of the electric pump can be more reliably inhibited.

Further, in an embodiment of the present invention, the fuel-cell vehicle is a two-wheeled vehicle that is equipped with down frames being connected to a head tube at the front portions and descending in the rearward direction of the vehicle body. In an embodiment of the present invention, the second radiator is located in the vicinity of the down frames. There is nothing, except a front wheel, to shield traveling up-flow of air in the vicinity of the down frames. Thus the second radiator can receive the traveling up-flow of air in quantity, and the heat dissipation efficiency improves accordingly.

A fuel-cell vehicle according to the present invention is equipped with, as a liquid cooling system, cooling fans to ventilate the cooling fins of a first radiator and a second radiator and an electric pump to circulate a coolant. The electric pump is disposed at a place where the electric pump can catch the flow of air created by a cooling fan. Thereby, it is possible to inhibit the electric pump from generating heat and improve the cooling efficiency of the cooling system even with a simple structure. Moreover, the thermal load of the cooling system does not increase.

Further, by locating the electric pump so that the projection thereof is in the projecting area of the second radiator on a front view plane, the air having passed through the second radiator during traveling is blown against the electric pump. Thus, the heat generation of the electric pump can be inhibited more reliably.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a front view of a two-wheeled fuel-cell vehicle according to the present embodiment.

DETAILED DESCRIPTION OF THE PREFERRED EMBODIMENTS

Figure 1:
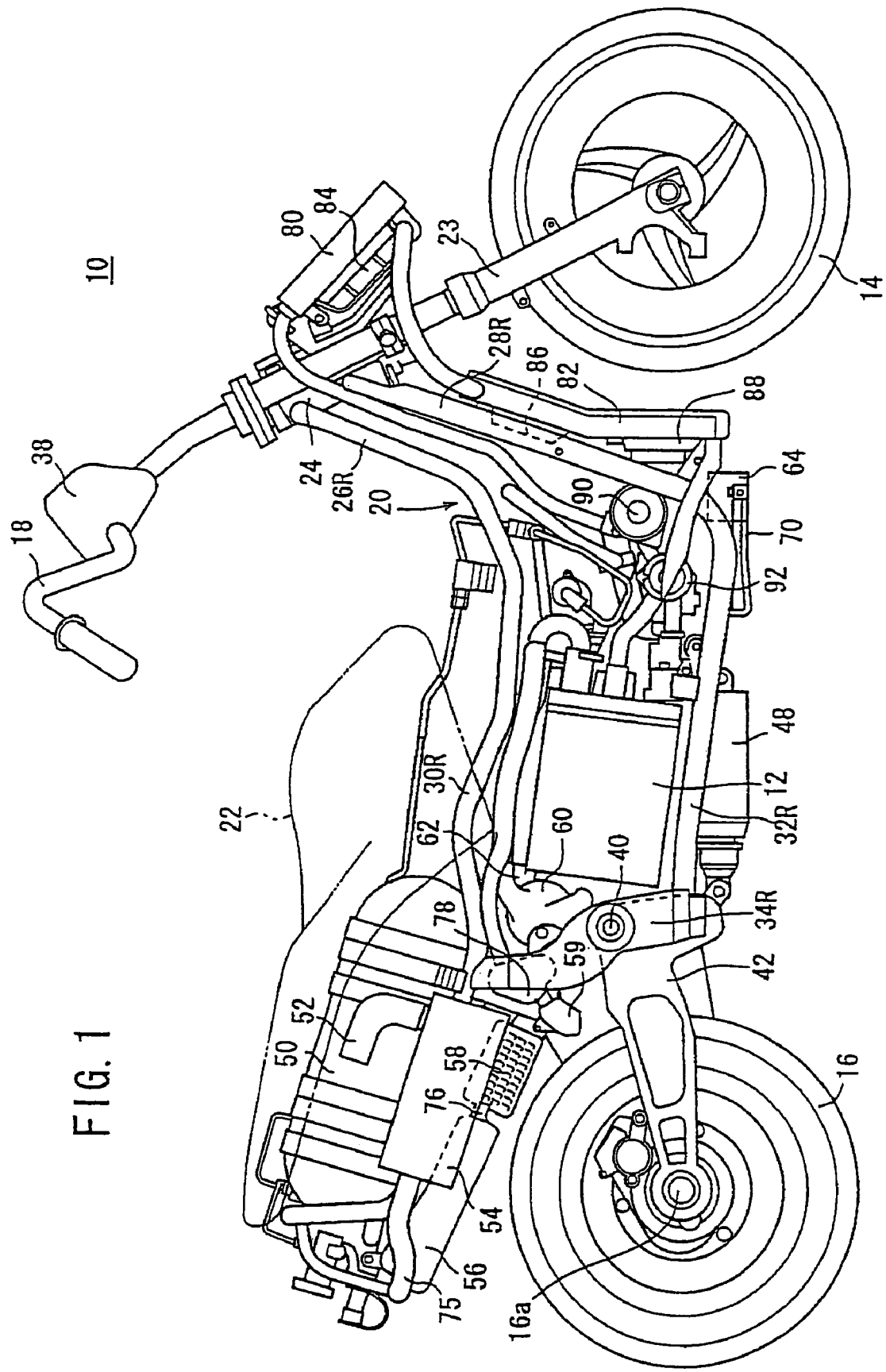
FIG. 1 is a right side view of a two-wheeled fuel-cell vehicle according to the present embodiment.

A fuel-cell vehicle according to the present invention is hereinafter explained while embodiments are shown by referring to FIGS. 1 to 6. Hereinafter, with regard to twin structures, one on the left side and the other on the right side, in a two-wheeled fuel-cell vehicle 10, those structures are explained separately with the character "L" attached to each reference numeral in the case of a left side structure and the character "R" attached to the same in the case of a right side structure.

Figure 2:
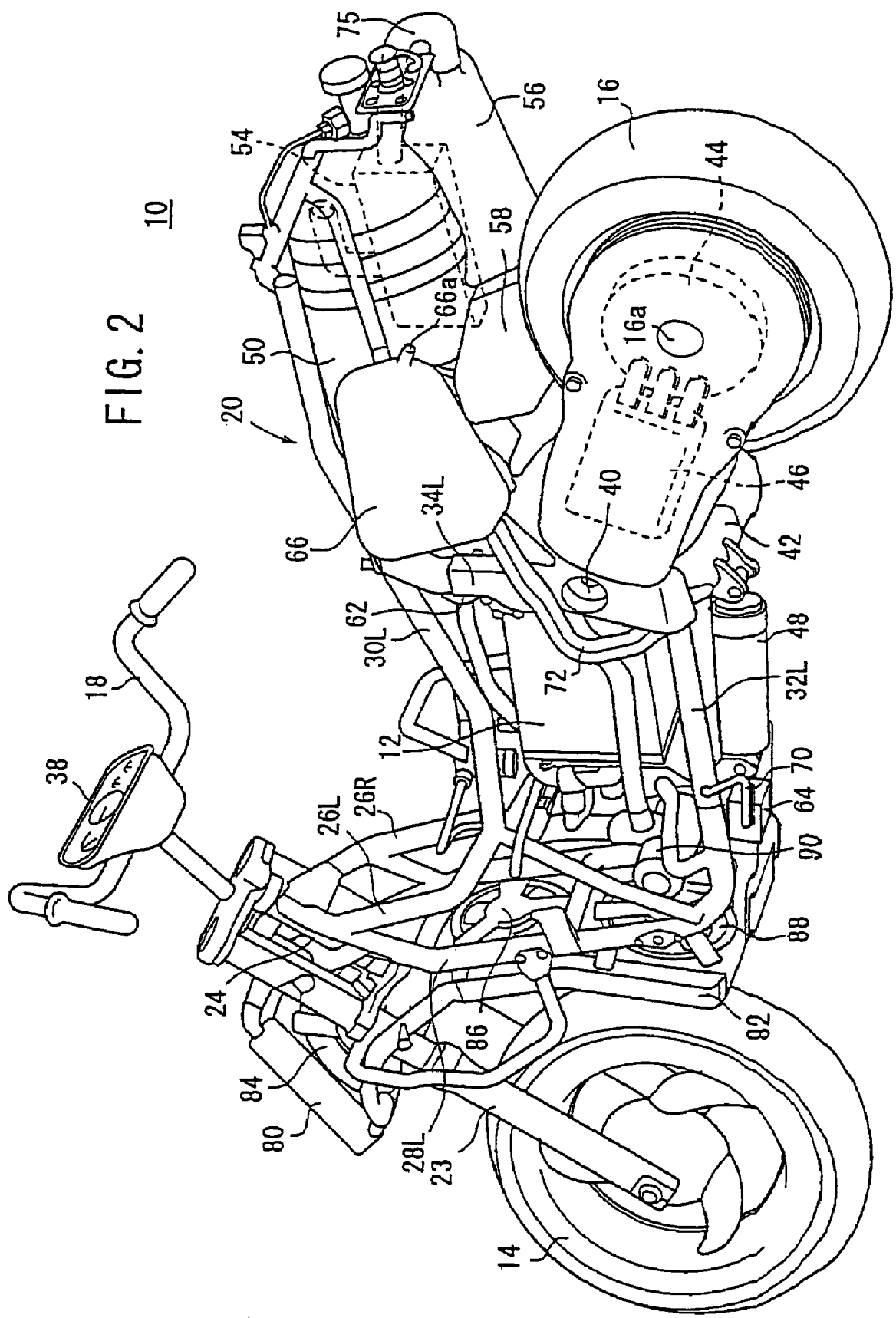
FIG. 2 is a perspective view of a two-wheeled fuel-cell vehicle according to the present embodiment viewed from a lower rear position on the left side.
Figure 3:
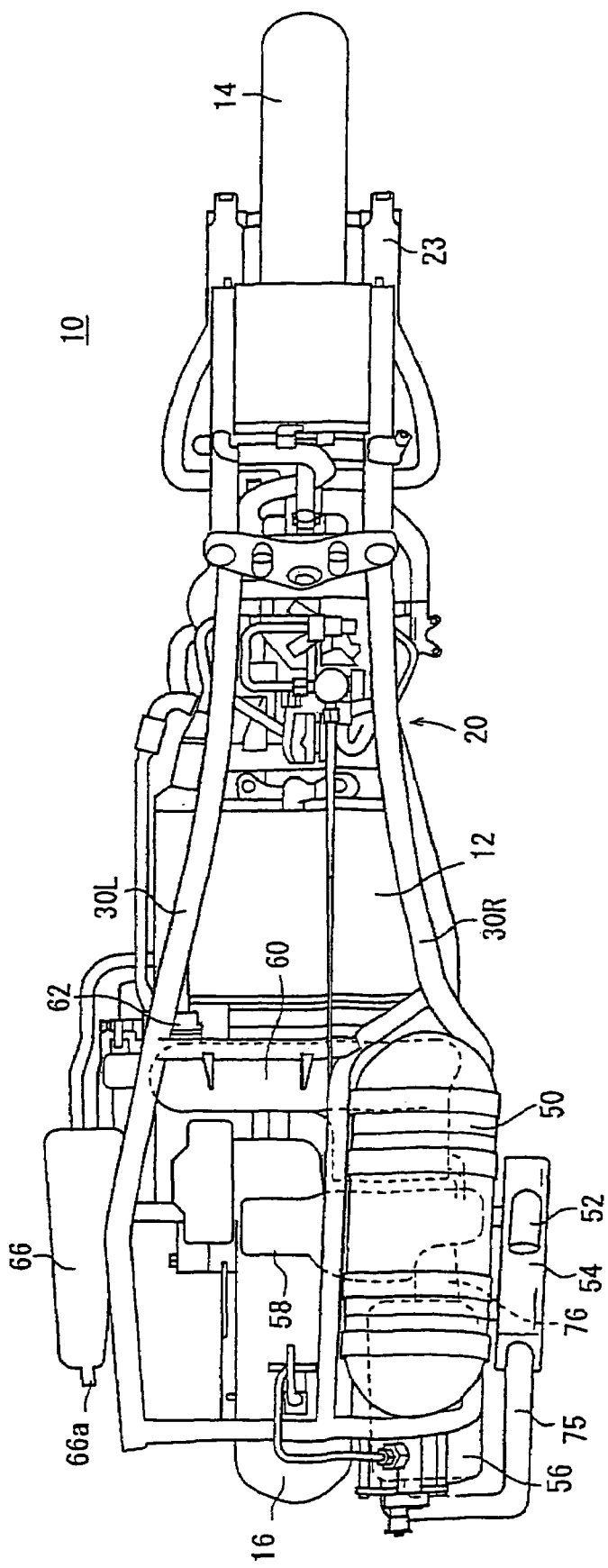
FIG. 3 is a plan view of a two-wheeled fuel-cell vehicle according to the present embodiment.

As shown in FIGS. 1 to 3, a two-wheeled fuel-cell vehicle 10 of a scooter type according to the present embodiment has a fuel cell 12 and travels by using the electric power generated by the fuel cell 12. The fuel cell 12 generates electric power by reacting a fuel gas (hydrogen gas) supplied to anodes with a reactive gas (air) supplied to cathodes. In the present embodiment, a known fuel cell 12 is adopted and thus no detailed explanations is provided. The two-wheeled fuel-cell vehicle 10 is provided with a front wheel 14 acting as a steering wheel, a rear wheel 16 acting as a drive wheel, a handlebar 18 to steer the front wheel 14, frames 20 and a seat 22 for a rider and a passenger.

Also, the two-wheeled fuel-cell vehicle 10 has a water cooling system 79 (refer to FIG. 5) in order to cool and keep the fuel cell 12 in an appropriate temperature range so as to be able to generate electric power efficiently.

The frames 20 are provided with a head tube 24 to support pivotally a fork-shaped front suspension 23 at the front portion and a pair of upper down frames 26R and 26L and a pair of lower down frames 28R and 28L. The upper and lower down frames are connected to the head tube 24 at the front portion and descend in the rearward direction of the vehicle body. The frames 20 are further provided with a pair of upper frames 30R and 30L extending continuously from the upper down frames 26R and 26L in the manner of ascending in the rearward direction of the vehicle body, a pair of lower frames 32R and 32L extending continuously from the lower down frames 28R and 28L toward the rear wheel 16 and a pair of vertical frames 34R and 34L connecting the rear end portions of the lower frames 32R and 32L to the substantially intermediate portions of the upper frames 30R and 30L.

The fuel cell 12 is disposed substantially at the center portion of the vehicle body. More specifically, the fuel cell 13 is positioned at the rear portion in the region encircled by the upper frames 30R and 30L, the lower frames 32R and 32L and the vertical frames 34R and 34L, in the manner of slightly ascending in the rearward direction. The fuel cell 12 is a relatively heavy part among the parts forming the two-wheeled fuel-cell vehicle 10. By disposing the fuel cell 12 substantially at the center portion of the vehicle body, the two-wheeled fuel-cell vehicle 10 can secure a good weight balance. Thus, the traveling performance is improved.

Further, at a position anterior to the fuel cell 12 in the region encircled by the upper frames 30R and 30L, the lower frames 32R and 32L and the vertical frames 34R and 34L, an electric pump 90 and others devices are disposed as will be described later. The seat 22 is disposed above the upper frames 30R and 30L. The tail lamps, not shown in FIGS. 1-4, are disposed at the rear end.

The front wheel 14 is supported pivotally in a rotatable manner at the lower end of the front suspension 23. The handlebar 18 is connected to the upper portion of the front suspension 23 and a meter 38 is disposed in the center of the handlebar 18. The rear wheel 16 is supported by a swing arm 42 rotatable around a pivot 40 disposed at the vertical frames 34R and 34L and is provided with an in-wheel motor 44 and a motor driver 46 that drives the in-wheel motor 44. The in-wheel motor 44 and the motor driver 46 are water-cooled and show a high efficiency and a high output. A rear suspension 48 is disposed under the fuel cell 12 in the manner of being extended in the longitudinal direction of the fuel-cell vehicle with both the end portions being rotatably connected to the lower frames 32R and 32L and the swing arm 42, respectively. A minimum ground clearance is stipulated for the fuel cell 12 in its design but, by disposing the rear suspension 48 under the fuel cell 12, the space between the fuel cell 12 and the ground can be used effectively and the center of the gravity of the two-wheeled fuel-cell vehicle 10 can be lowered.

Next, the two-wheeled fuel-cell vehicle 10 is provided with, as a fuel cell system to generate electric power in the fuel cell 12 a fuel gas container 50 to store a fuel gas supplied to the fuel cell 12 in a high pressure state, a resonator 54 to reduce the suction noise from an inlet 52 opening toward the rear direction, and an air cleaner 56 to take in the open air through the resonator 54. The inlet 52 is disposed on the upper face of the front portion of the resonator 54, bends mildly at an angle of about 90°, and opens in the rear direction.

The two-wheeled fuel-cell vehicle 10 is further provided with a compressor (called also a supercharger or a pump) 58 to compress the air purified in the air cleaner 56 and make a reactive gas, an intercooler 59 to cool the reactive gas compressed in the compressor 58, a humidifier 60 to exchange moisture between the reactive gas supplied to the fuel cell 12 and the used reactive gas exhausted from the fuel cell 12, a backpressure valve 62 disposed at the exhaust side of the humidifier 60 in order to regulate the pressure in the interior of the fuel cell 12, a dilution box 64 to dilute the used reactive gas with the used oxygen gas and a silencer 66 to silence the diluted reactive gas and exhaust it as the exhaust gas in the open air. Further, the two-wheeled fuel-cell vehicle 10 is equipped with a secondary battery (not shown in FIGS. 1-4) disposed in the vicinity of the front folk as the auxiliary electric source of the fuel cell system.

The fuel gas container 50 has a columnar shape with hemispheres on both the ends and is disposed at a rear portion of the vehicle body in a manner of deviating from the center to the right side. More specifically, the fuel gas container 50 extends in the longitudinal direction of the vehicle body in the top view (refer to FIG. 3) and is disposed in the manner of ascending in the rearward direction along the seat 22 and the upper frame 30R in the side view (refer to FIG. 1). The fuel gas container 50 is a relatively large part among the parts composing the two-wheeled fuel-cell vehicle 10 but, by disposing it so as to deviate from the center line, it scarcely overlaps the rear wheel 16 in the top view. Thus, the upward and downward suspension stroke of the rear wheel 16 can be sufficiently secured. Thereby, it becomes easier to mitigate the impact from a road and thus it becomes possible to improve the ride quality of the two-wheeled fuel-cell vehicle 10.

The dilution box 64 is disposed at the bottom end of the pair of the lower down frames 28R and 28L in between and located at a portion lower than the fuel cell 12. Hence, the dilution box 64 is likely to accumulate moisture generated in the fuel cell 12 and the accumulated moisture is exhausted from the lower portion of the dilution box 64.

A first exhaust pipe 70 is connected to the dilution box 64 and the exhaust gas is discharged from the first exhaust pipe 70. The first exhaust pipe 70 is disposed so that it extends from a portion somewhat anterior to the center of the lower frame 32L toward the rear direction through the interior of the lower frame 32L and the rear end thereof is connected communicatively to an end of a second exhaust pipe 72. The second exhaust pipe 72 bends somewhat above the rear end of the lower frame 32L, runs in the manner of obliquely ascending in the rearward direction, and is connected to the silencer 66.

The silencer 66 has a substantially square vertically flat shape, is disposed so as to deviate from the center to the left at a rear portion of the vehicle body, and extends in the longitudinal direction of the vehicle at a position higher than the rear wheel 16. An outlet 66a, through which the exhaust gas from the silencer 66 is discharged, is disposed at the lower portion of the rear end of the silencer 66. The outlet 66a is located at a position somewhat posterior to the axle 16a of the rear wheel 16 in the longitudinal direction of the vehicle.

Figure 4:
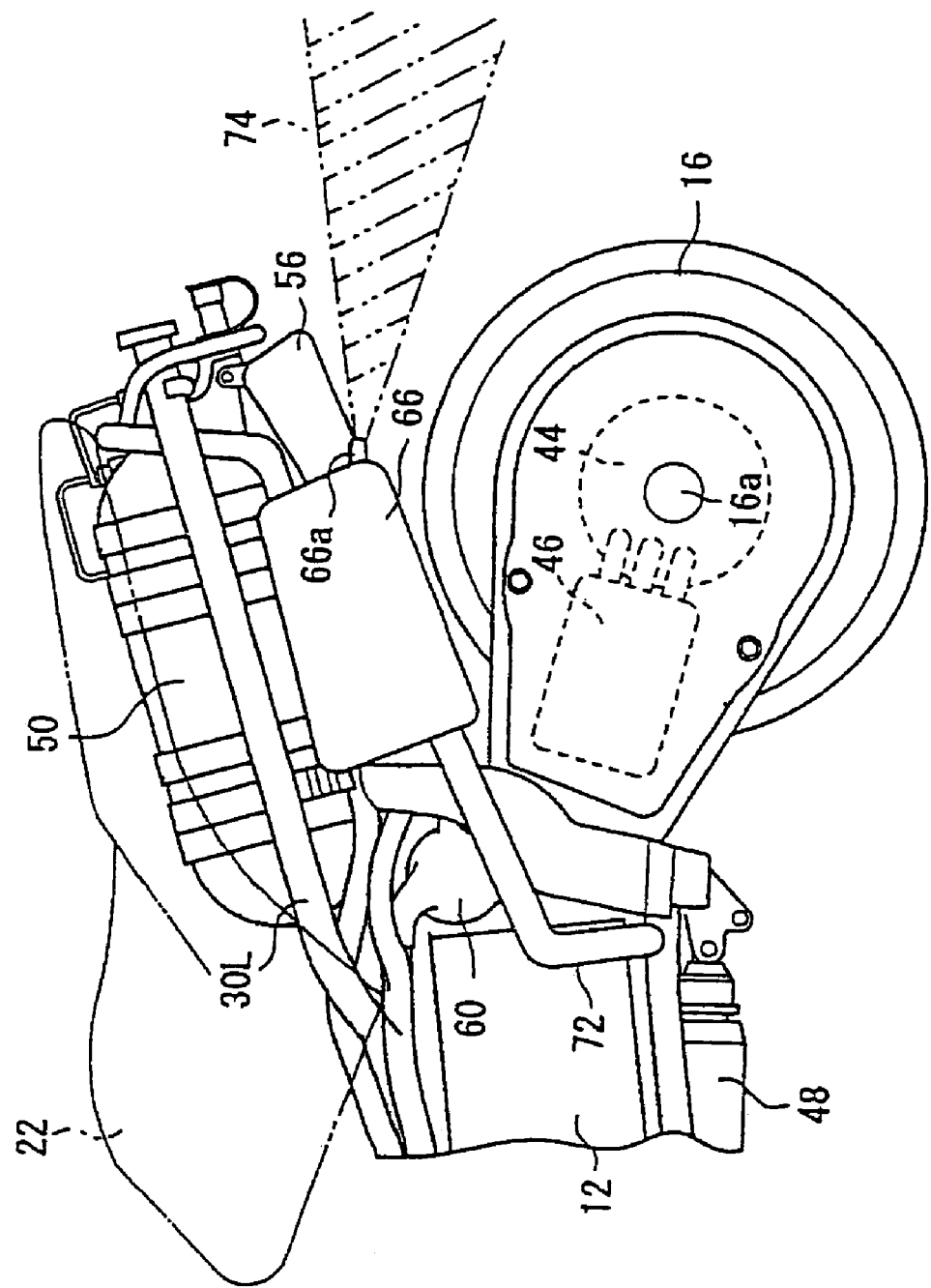
FIG. 4 is a left side view of the rear portion of a two-wheeled fuel-cell vehicle.

Since, as explained above, the outlet 66a is located at a position higher than the rear wheel 16 and moreover posterior to the axle 16a thereof in the anteroposterior direction, the exhaust gas discharged from the outlet 66a is diffused rearward by the traveling up-flow of air and discharged in the region 74 hatched by the chain double-dashed lines as shown in FIG. 4. As a consequence, the rear wheel 16 is not directly exposed to the water vapor (or moisture) contained in the exhaust gas. Further, even when the two-wheeled fuel-cell vehicle 10 travels at a small turning radius, the water vapor diffuses obliquely rearward and the rear wheel 16 is never exposed thereto.

The resonator 54 has a substantially square vertically flat shape and is disposed on the right side of the fuel gas container 50. The rear end of the resonator 54 is connected to the rear end of the air cleaner 56 through a resin pipe 75.

The air cleaner 56 has a somewhat flat shape and is disposed so as to ascend in the rearward direction under the rear portion of the fuel gas container 50. The air having passed through the air cleaner 56 is introduced into the right end portion of the compressor 58 through a short resin pipe 76. The compressor 58 is disposed so as to extend in the direction of the vehicle width and the right end portion is located under the center portion of the fuel gas container 50. The humidifier 60 is long in the direction of the vehicle width and disposed between the compressor 58 and the fuel cell 12.

The intercooler 59 is disposed under of the front portion of the fuel gas container 50 and the air inlet and air outlet are connected to the compressor 58 and the humidifier 60, respectively. The intercooler 59 cools the air compressed by the compressor 58 and supplies it to the humidifier 60 as described above but, at the time of startup in a cold climate, by switching a bypass valve 78, the compressed air can be supplied to the fuel cell 12 without passing through the intercooler 59 and the humidifier 60.

Figure 5:
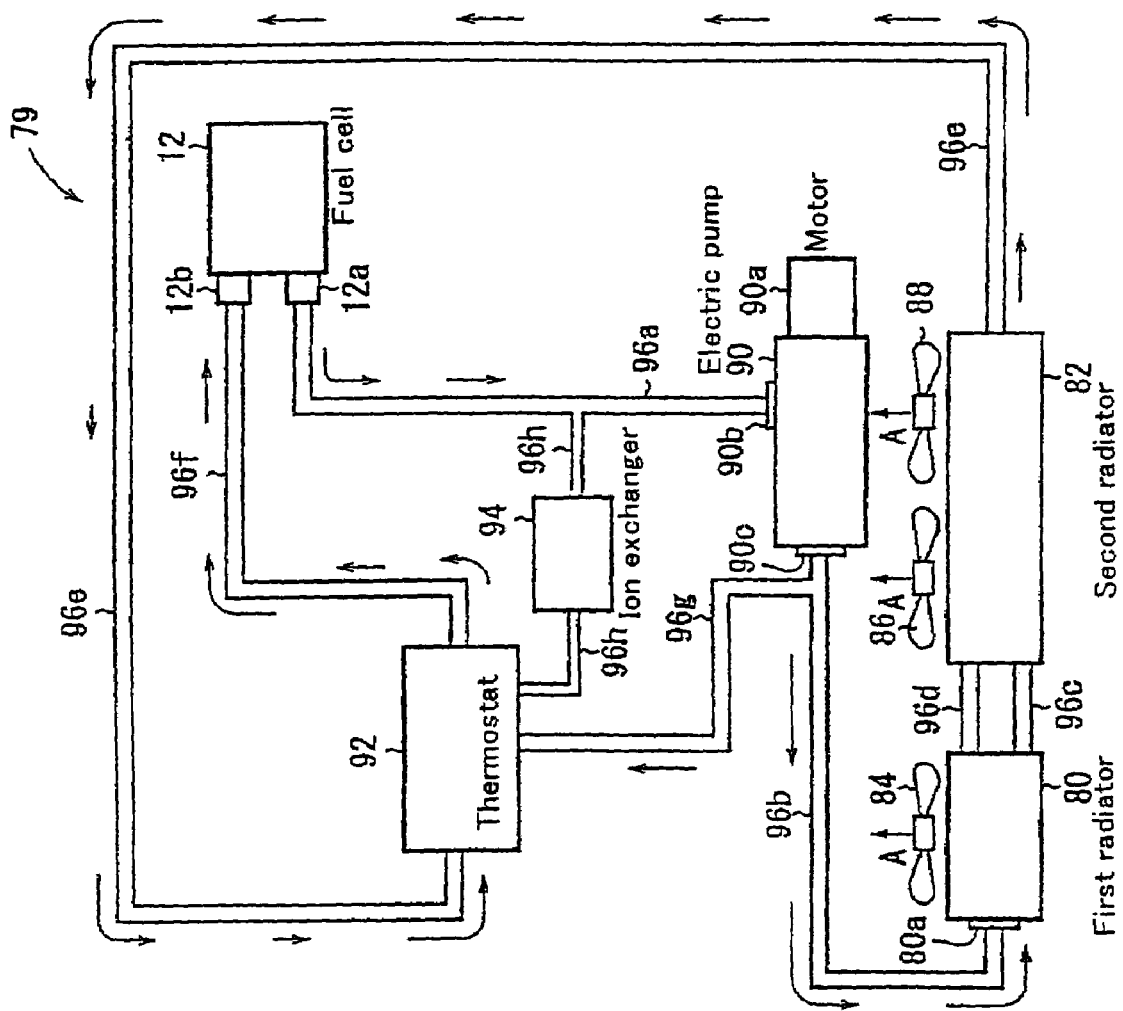
FIG. 5 is a block diagram showing the cooling system of a two-wheeled fuel-cell vehicle.

Next, the water cooling system 79 to cool the fuel cell 12 and keep it in an appropriate temperature range is explained with reference to FIG. 5.

The cooling system 79 is provided with a first radiator 80 and a second radiator 82 to dissipate heat with the cooling fins and cool the cooling water warmed by the fuel cell 12 A cooling fan 84 is provided to ventilate the cooling fins of the first radiator 80. Two cooling fans 86 and 88 are provided to ventilate the cooling fins of the second radiator 82. An electric pump 90 is provided to circulate the cooling water with a thermostat 92 to switch the circulation path of the cooling water at the time of the warm-up operation or in a supercooled state. An ion exchanger 94 is provided to remove ions in the cooling water and prevent the earth of the fuel cell 12. As illustrated in FIGS. 1 and 2, the electric pump 90 is disposed on the downstream side of the cooling fan 88.

The cooling fans 84, 86 and 88 are located on the backside of the first radiator 80 and the second radiator 82 and suck air from the radiators, respectively. The air flows as shown by the arrows A. Among the flow of air shown by the arrows A, the flow of air created by the cooling fan 88 is so designed as to blow against the electric pump 90.

The electric pump 90 is equipped with a motor 90a and the pump part is operated by electrically rotating the motor 90a. Thus, the cooling water can circulate in the cooling system 79. The inlet 90b of the electric pump 90 is connected to the cooling water outlet 12a of the fuel cell 12 through a pipe line 96a, and the outlet 90c of the electric pump 90 is connected to the cooling water outlet 12a of the fuel cell 12 through a pipe line 96b.

The lower portion of the first radiator 80 is connected to the upper portion of the second radiator 82 through two pipe lines 96c and 96d allocated right and left, respectively. Refer to FIG. 6. One end of the thermostat 92 is connected to the lower portion of the second radiator 82 through a pipe line 96e, and the other end thereof is connected to the cooling water inlet 12b of the fuel cell 12 through a pipe line 96f. The pipe line 96b between the electric pump 90 and the first radiator 80 branches to form a pipe line 96g and the pipe line 96g is connected to the thermostat 92. The pipe line 96a between the fuel cell 12 and the electric pump 90 branches to form a pipe line 96h and the pipe line 96h is connected to the thermostat 92 through the ion exchanger 94. Gas venting portions are provided for the fuel cell 12 and the ion exchanger 94, respectively. The gas venting portions are not shown in FIGS. 1-6. A hydrogen sensor is provided for the pipe line 96a though it is not shown in FIGS. 1-6.

At the time of the warm-up operation or in a supercooled state, the thermostat 92 connects the pipe line 96g to the pipe line 96f to communicate with each other and blocks off the pipe line 96e. Thereby, the cooling water discharged from the electric pump 90 flows in the pipe line 96g and is not routed through the first radiator 80 and the second radiator 82. As a result, the cooling water is not unnecessarily cooled and rapid warm-up can be secured.

Meanwhile, during normal operation, the thermostat 92 connects the pipe line 96e to the pipe line 96f to communicate with each other and blocks off the pipe line 96g. Thereby, the warmed cooling water discharged from the electric pump 90 is cooled by heat dissipation at the first radiator 80 and the second radiator 82 and thereafter introduced into the cooling water inlet 12b of the fuel cell 12 through the thermostat 92. The cooling water warmed by cooling power generation cells (not shown in FIGS. 1-6) in the fuel cell 12 is discharged through the cooling water outlet 12a, introduced into the electric pump 90, and circulated. Further, some of the cooling water circulates through the ion exchanger 94.

As shown in FIG. 6, the first radiator 80 has a substantially square tabular shape and is disposed in front of the head tube 24, and the cooling fan 84 is disposed behind the first radiator 80. The second radiator 82 has a tabular shape and is substantially twice the size of the first radiator 80 in both height and area, and is disposed right in front of the lower down frames 28R and 28L in the manner of following the lower down frames 28R and 28L. The cooling fan 86 is disposed behind the upper part of the second radiator 82 and the cooling fan 88 is disposed behind the lower part of the second radiator 82. The electric pump 90 is disposed between the cooling fan 88 and the fuel cell 12.

Since the first radiator 80 and the second radiator 82 do not overlap each other on a plane perpendicular to the longitudinal direction of the vehicle, they tend to catch traveling up-flow of air effectively when the two-wheeled fuel-cell vehicle 10 is traveling and can dissipate heat and cool the cooling water passing through the interior. Further, the cooling fans 84, 86 and 88 function so as to suck the air through the first radiator 80 and the second radiator 82 and send the air rearward, accelerate the ventilation of the cooling fins of the first radiator 80 and the second radiator 82. Thus the cooling water can be cooled more reliably.

In a two-wheeled fuel-cell vehicle 10 configured as above, as shown in FIG. 6, the electric pump 90 is located so that the projection thereof is in the projecting area of the second radiator 82 on a plane perpendicular to the longitudinal direction of the fuel-cell vehicle. When the two-wheeled fuel-cell vehicle 10 travels, the air having passed through the second radiator 82 blows against the electric pump 90. The electric pump 90 is equipped with the motor 90a and, when the motor 90a generates heat, the efficiencies of the motor 90a and the electric pump 90 is lowered. However, in the case of a two-wheeled fuel-cell vehicle 10 according to the present embodiment, since the air having passed the second radiator 82 exerts cooling action on the electric pump 90, the temperature rise of the motor 90a is inhibited. Thereby, the efficiencies of the motor 90a and the electric pump 90 are inhibited from lowering and the amount of the circulating cooling water is secured. Hence, the efficiency of the cooling system 79 is prevented from deteriorating.

Since the electric pump 90 is located in the projecting area of the second radiator 82, the so-called frontal projecting area does not increase. Thus, the air resistance of the two-wheeled fuel-cell vehicle 10 during traveling does not increase either.

Further, since the electric pump 90 is located at a position where it receives the wind created by the cooling fan 88, it is subjected to a so-called forced air cooling. Thus, the efficiencies of the motor 90a and the electric pump 90 are further inhibited from being lowered.

The electric pump 90 receives mainly the wind created by the nearby cooling fan 88, but in practice a cowling is mounted on the two-wheeled fuel-cell vehicle 10. Therefore, at least a part of the flow of air created by the cooling fans 84 and 86 passes through the inside of the cowling, blows against the electric pump 90, and accelerates cooling.

Further, the flow of air having cooled the electric pump 90 blows against the fuel cell 12 located at the back. Thus, the fuel cell 12 is also subjected to forced air cooling, and the power generation efficiency can be improved.

Since the electric pump 90 is located under the lee of the second radiator 82, the electric pump 90 affects the flow of air which the second radiator 82 receives at the front. In addition, the air cooling of the electric pump 90 does not cause the heat dissipation efficiency of the second radiator 82 to be lowered. The electric pump 90 is not water-cooled but air-cooled. Thus, the electric pump 90 does not cause the heat load of the cooling system 79 that is water-cooled to increase.

As illustrated in FIG. 6, since the second radiator 82 is located in the vicinity of the lower down frames 28R and 28L, there is nothing to shield the traveling up-wind except the front wheel 14. Therefore, the second radiator 82 can receive the traveling up-wind in large quantity. Thus, the heat dissipation efficiency of the cooling system 79 improves.

Here, levers, cowlings and others are not shown in FIGS. 1 to 4 and 6. Further, in FIG. 3, the handlebar 18 and the meter 38 are not shown so that the frames 20 and others are visible.

Though the above explanations have been done on the premise that the cooling system 79 is of a water cooling type, a liquid cooling type system such as an oil cooling type or the like may be adopted. With regard to the cooling fans 84, 86 and 88, though the explanations have been done on the basis of the type of sucking air at the back of the first radiator 80 and the second radiator 82, a type of sending air from the front side of the first radiator 80 and the second radiator 82 may be adopted, for example.

It is a matter of course that a fuel-cell vehicle according to the present invention is not limited to the aforementioned embodiments but may take various configurations without deviating from the tenor of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel-cell vehicle for traveling by electric power generated by supplying a reactive gas and a fuel gas to a fuel cell that is cooled by a liquid cooling system,
   the fuel-cell vehicle comprising:
   a first radiator and a second radiator for dissipating heat and cooling a coolant warmed by said fuel cell;
   at least first and second cooling fans for ventilating cooling fins of said first and second radiators, respectively; and
   an electric pump, disposed along a pipe line of said cooling system for circulating the coolant;
   wherein said electric pump is disposed at a position where said electric pump can catch the flow of air created by the second cooling fan,
   wherein the flow of air created by the second cooling fan and directed to the electric pump is thereafter directed to the fuel cell for cooling the fuel cell.

2. The fuel-cell vehicle according to claim 1, wherein the first cooling fan is operatively mounted relative to said first radiator, and
   the second cooling fan is operatively mounted relative to said second radiator and is disposed adjacent to said electric pump for providing a flow of air thereto.

3. The fuel-cell vehicle according to claim 2, wherein said first cooling fan and said second cooling fan suck air to flow though the first and second radiators to create an air flow wherein the air flow from the second cooling fan is designated to blow against said electric pump.

4. The fuel-cell vehicle according to claim 2, wherein said second cooling fan and a third cooling fan are provided adjacent to the second radiator for sucking air to flow though the second radiator.

5. The fuel-cell vehicle according to claim 1, wherein said electric pump is located so that the projection thereof is in the projecting area of said second radiator on a plane perpendicular to the longitudinal direction of said fuel-cell vehicle.

6. The fuel-cell vehicle according to claim 5, wherein said fuel-cell vehicle is a two-wheeled vehicle equipped with down frames being connected to a head tube at front portions and descending in a rearward direction of a vehicle body; and said second radiator is located in the vicinity of said down frames.

7. The fuel-cell vehicle according to claim 1, wherein said first radiator is disposed in front of the vehicle and the second radiator is larger relative to the first radiator and is disposed adjacent to the electric pump.

8. The fuel-cell vehicle according to claim 1, wherein said fuel-cell vehicle is a two-wheeled vehicle equipped with down frames being connected to a head tube at front portions and descending in a rearward direction of a vehicle body; and said second radiator is located in the vicinity of said down frames.

9. The fuel-cell vehicle according to claim 1, wherein the first and second radiators do not overlap each other on a plane perpendicular to the longitudinal direction of the vehicle.

10. A liquid cooling system for cooling a fuel cell of a fuel-cell vehicle comprising:
a first radiator and a second radiator for dissipating heat and cooling a coolant warmed by said fuel cell;
at least first and second cooling fans for ventilating cooling fins of said first and second radiators, respectively; and
an electric pump, disposed along a pipe line of said cooling system for circulating the coolant;
wherein said electric pump is disposed at a position where said electric pump can catch the flow of air created by the second cooling fan,
wherein the flow of air created by the second cooling fan and directed to the electric pump is thereafter directed to the fuel cell for cooling the fuel cell.

11. The liquid cooling system for cooling a fuel cell of a fuel-cell vehicle according to claim 10, wherein the first cooling fan is operatively mounted relative to said first radiator, and
the second cooling fan is operatively mounted relative to said second radiator and is disposed adjacent to said electric pump for providing a flow of air thereto.

12. The liquid cooling system for cooling a fuel cell of a fuel-cell vehicle according to claim 11, wherein said first cooling fan and said second cooling fan suck air to flow through the first and second radiators to create an air flow wherein the air flow from the second cooling fan is designated to blow against said electric pump.

13. The liquid cooling system for cooling a fuel cell of a fuel-cell vehicle according to claim 11, wherein said second cooling fan and a third cooling fan are provided adjacent to the second radiator for sucking air to flow through the second radiator.

14. The liquid cooling system for cooling a fuel cell of a fuel-cell vehicle according to claim 10, wherein said electric pump is located so that the projection thereof is in the projecting area of said second radiator on a plane perpendicular to the longitudinal direction of said fuel-cell vehicle.

15. The liquid cooling system for cooling a fuel cell of a fuel-cell vehicle according to claim 14, wherein said fuel-cell vehicle is a two-wheeled vehicle equipped with down frames being connected to a head tube at front portions and descending in a rearward direction of a vehicle body; and said second radiator is located in the vicinity of said down frames.

16. The liquid cooling system for cooling a fuel cell of a fuel-cell vehicle according to claim 10, wherein said fuel-cell vehicle is a two-wheeled vehicle equipped with down frames being connected to a head tube at front portions and descending in a rearward direction of a vehicle body; and said second radiator is located in the vicinity of said down frames.

17. The liquid cooling system for cooling a fuel cell of a fuel-cell vehicle according to claim 10, wherein said first radiator is disposed in front of the vehicle and the second radiator is larger relative to the first radiator and is disposed adjacent to the electric pump.

18. The liquid cooling system for cooling a fuel cell of a fuel-cell vehicle according to claim 10, wherein the first and second radiators do not overlap each other on a plane perpendicular to the longitudinal direction of the vehicle.

19. A fuel-cell vehicle for traveling by electric power generated by supplying a reactive gas and a fuel gas to a fuel cell that is cooled by a liquid cooling system, the fuel-cell vehicle comprising:
a first radiator and a second radiator for dissipating heat and cooling a coolant warmed by said fuel cell;
a first cooling fan for ventilating cooling fins of said first radiator, and
second and third cooling fans for ventilating cooling fins of lower and upper parts of said second radiator, respectively; and
an electric pump, disposed along a pipe line of said cooling system for circulating the coolant;
wherein said electric pump is disposed at a position where said electric pump can catch the flow of air created by the second cooling fan, and
the third cooling fan that cools the upper part of the second radiator is disposed in a position that is below the first cooling fan that cools the first radiator.

* * * * *